(12) United States Patent
Watanabe et al.

(10) Patent No.: US 7,127,568 B2
(45) Date of Patent: Oct. 24, 2006

(54) THROTTLING IN STORAGE SYSTEMS

(75) Inventors: Naoki Watanabe, Sunnyvale, CA (US); Shigeru Kishiro, Odawara (JP)

(73) Assignee: Hitachi, Ltd., Tokyo (JP)

( * ) Notice: Subject to any disclaimer, the term of this patent is extended or adjusted under 35 U.S.C. 154(b) by 203 days.

(21) Appl. No.: 10/351,053

(22) Filed: Jan. 23, 2003

(65) Prior Publication Data
US 2004/0148484 A1    Jul. 29, 2004

(51) Int. Cl.
*G06F 12/00* (2006.01)
(52) U.S. Cl. ............... 711/154; 711/170; 711/113; 709/235
(58) Field of Classification Search ........... 711/170, 711/154, 113; 709/235
See application file for complete search history.

(56) References Cited

U.S. PATENT DOCUMENTS

| | | | |
|---|---|---|---|
| 5,493,566 A * | 2/1996 | Ljungberg et al. ........... | 370/231 |
| 5,680,580 A | 10/1997 | Beardsley et al. | |
| 5,706,467 A * | 1/1998 | Vishlitzky et al. .......... | 711/129 |
| 5,901,327 A | 5/1999 | Ofek | |
| 5,926,834 A * | 7/1999 | Carlson et al. ............. | 711/152 |
| 6,088,697 A | 7/2000 | Crockett et al. | |
| 6,157,991 A | 12/2000 | Arnon | |
| 6,275,183 B1 * | 8/2001 | Springer ...................... | 342/195 |
| 6,434,681 B1 * | 8/2002 | Armangau ................... | 711/162 |
| 6,496,277 B1 * | 12/2002 | Chapin et al. ............. | 358/1.16 |
| 2003/0050974 A1 * | 3/2003 | Mani-Meitav et al. ...... | 709/203 |
| 2003/0177322 A1 * | 9/2003 | Crockett et al. ............ | 711/161 |

OTHER PUBLICATIONS

IBM International Technical Support Organization, "Planning for IBM Remote Copy," Doc. No. SG24-2595-00 (from Chapter 8, "ORC Performance"), pp. 105-6.
Mark Blunden, et al., "Implementing ESS Copy Services on S/390," IBM International Technical Support Organization, Doc. No. SG24-5680-00 (Dec. 2000), pp. 92-5.

\* cited by examiner

*Primary Examiner*—Pierre Bataille
*Assistant Examiner*—Sheng-Jen Tsai
(74) *Attorney, Agent, or Firm*—Townsend and Townsend and Crew LLP

(57) ABSTRACT

A method is provided for improving the performance of copy operations in storage systems. The method includes storing a measure of relative availability of storage system resources, detecting operations when sequential portions of a storage media are to be accessed for writing of information, and when the measure of relative availability of system resources drops to a specified extent, introducing a wait into the operation in which sequential portions of a storage media are to be accessed for writing of information. In another implementation, a method is provided for controlling writing of data in a storage system in which a step is performed of analyzing a requested write operation to determine if the requested write operation calls for a sequential task or a random task. If the requested write operation is a sequential task, information about it is stored in a task management table. the table is used to determine if throttling is needed to carry out the requested write operation, and invokes throttling if it is needed.

26 Claims, 8 Drawing Sheets

| Group # | Throughput | | Cache size | |
|---|---|---|---|---|
| | Allocated | Current | Allocated | Current |
| 0 | 10MB/s | 0.1MB/s | 500MB | 32MB |
| 1 | 10MB/s | 2MB/s | 250MB | 120MB |
| 2 | 50MB/s | 20MB/s | 1GB | 28MB |

Figure 7

| Sequential Task # | Disk # | Throughput | | Cache size | |
|---|---|---|---|---|---|
| | | Allocated | Current | Allocated | Current |
| 0 | 1 | 10MB/s | 0.1MB/s | 250MB | 32MB |
| 1 | 1 | 10MB/s | 2MB/s | 250MB | 120MB |
| 2 | 3 | 10MB/s | 11MB/s | 1GB | 28MB |

Figure 8

THROTTLING IN STORAGE SYSTEMS

BACKGROUND OF THE INVENTION

This invention relates to storage systems, and in particular to storage area networks in which copying and remote copying of data provided by a host is provided. Modern storage systems provide users with the capability of storing and backing up enormous amounts of data quickly over networks to various local and remote locations. In such systems, at the time an initial copy of information is stored on hard disk drives at a primary storage site, a remote copy is made to corresponding hard disk drives at a secondary storage site. The storage system is typically configured to automatically copy the entire disk, and configure the disks at the primary and remote storage sites as "remote copy pairs." In performing these operations, data is provided to the hard disks at the primary site under control of a host system. The operation is typically performed by the host sending data and write requests to the primary storage system, which acknowledges receipt of those write requests. As the data arrives at the primary storage system from the host, it is usually stored in a cache memory before being written to hard disk drives in the storage system. Either synchronously with the writing of the data to the hard disk drives, or asynchronously, the data is also written to storage media in a secondary storage system, typically located remotely from the primary storage system. In this manner, highly reliable access to the data is provided, making the system less susceptible to natural disasters or other events which may damage or destroy one of the two storage systems.

One problem which occurs in storage systems is commonly known as cache puncture or cache overflow. Each time data is to be written to a selected portion of the storage system, for example, a particular hard disk drive or a group of hard disk drives, the data is first transferred to a cache memory. This allows the high speed host system and its affiliated bus network to operate at speeds much higher than those employed in the electromechanical writing of data onto hard disk drives. In this manner, the computer system will continue to operate and perform other calculations or provide other services to the user, while the data is being written to the disks in the much slower electromechanical operations common to hard disk drives or other storage systems.

Normally, the random nature of reading and writing data in a large storage system will not overwhelm any particular component because the components have been appropriately sized for operation in these circumstances. In some circumstances, however, access from the host to the primary storage system will be sequential, that is, with many consecutive sectors targeted at only one or a small group of hard disk drives, for example, operations such as batch or backup processes which create large loads on small portions of the storage system. Cache puncture is more likely in these circumstances.

FIG. 11 is a diagram which illustrates a typical circumstance of cache puncture. As shown in the second row of the diagram, host operations up through a given time t will be normal and have minimal impact on the cache memory. In the example depicted, however, beginning at time t the host accesses become heavy, to the point of exceeding the maximum capability of the remote copy (RC) or even the primary storage system. In these circumstances, as shown by the cross-hatched portion of the curve in FIG. 11, an overloaded condition occurs in which more data is being transmitted to the storage system than the storage system is capable of storing immediately. This large amount of data will be attempted to be stored in the cache memory, which is essentially functioning as a buffer between the high speed host the slower speed disk drives. If the large demand for storage continues as shown by the upper curve in FIG. 11, eventually the capability of the cache will be exceeded, as shown by the location designated "X" in FIG. 11. At this point the host will need to intervene to reschedule writing the data until a later time or take some other action. The lower two rows in FIG. 11 illustrate a normal operation in which the host access never reaches the maximum performance line (shown dashed). Thus, there will be no cache puncture, and the overall operation will be carried out in the normal manner.

In prior art systems, the solution to cache puncture was to send an error message and stop the writing operation until it could be rescheduled for a time when demands were lower. This slowed overall system operation. In addition, in some prior art systems, a wait condition was introduced to place host operations on hold for enough time to allow the cache memory to become available. This wait condition was introduced, however, only at the time of error messages, and not in circumstances as a preventive measure to preclude the error message in the first place. For example, IBM in its document entitled "Implementing ESS Copy Services on S/390" describes two techniques: (1) If data in cache exceeds a predefined limit, I/O will be blocked to the specific volume with the highest write activity, and (2) a temporary write peak will cause a session to be suspended. Accordingly, what is needed is an improved technique for controlling the operations of the host, a primary system and a secondary subsystem in a manner which precludes cache puncture, yet still provides high speed performance.

BRIEF SUMMARY OF THE INVENTION

This invention provides improved performance for storage systems, and particularly those employing remote copy technology. This invention provides a system in which data access between the host and the primary storage system, or elsewhere if desired, is "throttled" to control the flow of data and maintain it within desired parameters. As a result, cache puncture or cache overflow is precluded, and overall system performance is increased. The invention enables the control of operations to single hard disk drives or volumes, but can also be employed in cases involving groups of drives or groups of volumes. The throttling can be achieved by controlling the extent of use of the cache memory, or by inserting wait times into the instruction flow, or both. The control can be performed on the basis of groups of disks or tasks. Throughput between the host and the primary storage system can also be used as a measure of the load on the system, and as a source of implementing throttling. The system administrator can set the throughput value for individual volumes or groups of volumes, or for each task. In addition, if the size of the cache is managed, a control parameter may be the size of the cache, the ratio of the size of the cache to the number of volumes, or other desired parameter. In some implementations, combinations of control techniques are employed for controlling throttling.

In a preferred embodiment, the invention includes a storage system which operates under computer control and which is coupled to a host to receive information to be stored. The method includes the steps of monitoring communications between the host and the storage system to determine a measure of throughput requested by the host in having the storage system write data into the storage system, and sending to the host a request to wait if the measure of throughput exceeds a specified quantity. The specified quantity can be statistically derives or preprogrammed into the system.

In another implementation, a storage system has a cache memory for storing information before the information is written to storage media in the storage system. The storage system operates under computer control and is connected to a host to receive information for storage in the storage system. The communications between the host and the storage system are monitored to determine a measure of the remaining capacity of the cache memory, and if that capacity is determined to be inadequate, then sending of data from the host is delayed.

In another embodiment of the invention, the data written into a storage system is controlled by analyzing the requested write operations to determine if they call for sequential tasks or random tasks. If the tasks are sequential, then information about them is stored in a task management table. The table is then used to determine whether throttling is needed to carry out requested write operations. If carrying out those operations requires throttling, then an appropriate throttling technique is employed.

BRIEF DESCRIPTION OF THE DRAWINGS

FIG. 7 is an example of a statistics table for groups of volumes;
FIG. 8 is an example of a statistics table for a task.

DESCRIPTION OF THE PREFERRED EMBODIMENTS

Figure 1:
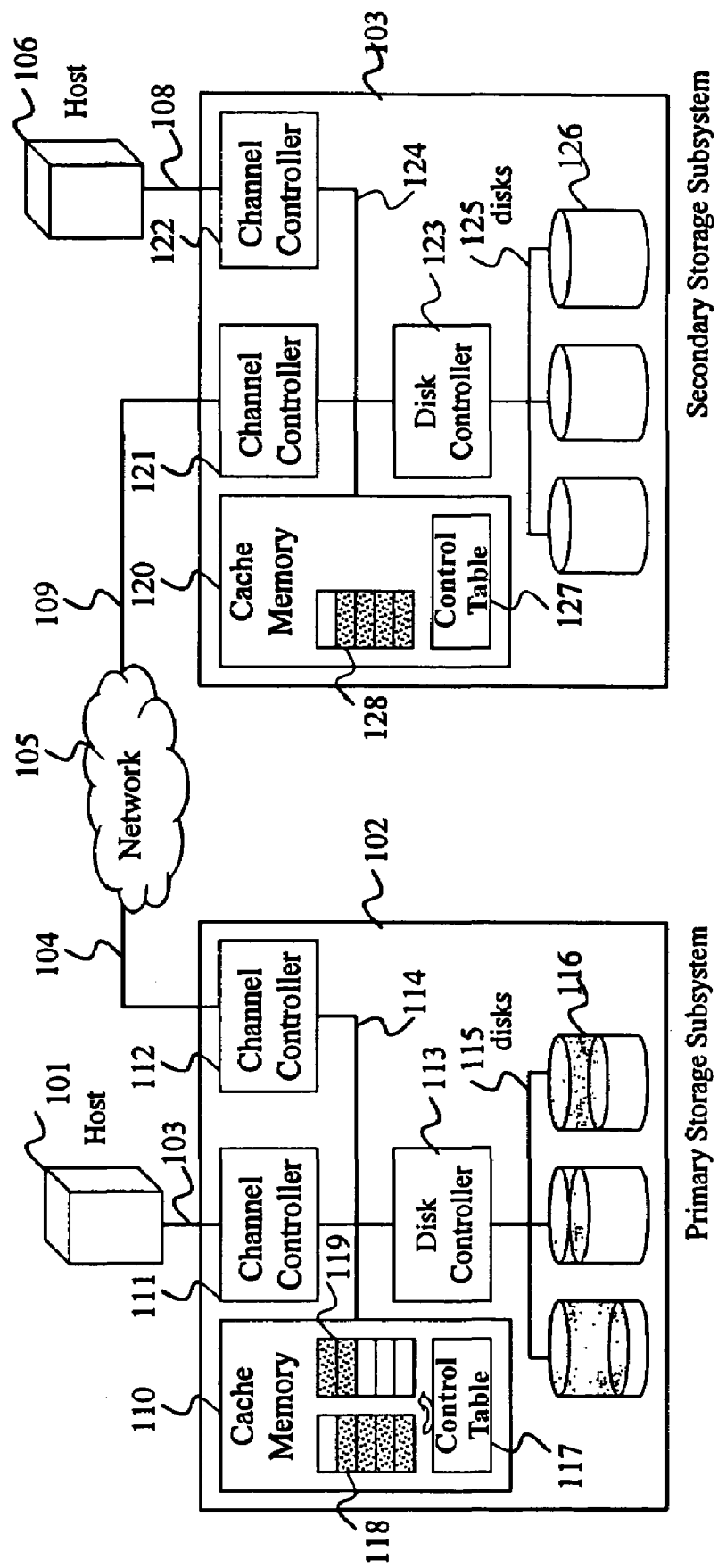
FIG. 1 is an overall block diagram of a storage system.

FIG. 1 is a diagram illustrating a typical prior art storage system in which a primary storage subsystem 102 is coupled to a secondary storage subsystem 103 through a network 105. Typically, network 105 will be a conventional network, for example, a network using ATM, sonet, dark fibre, or internet protocol communications. Furthermore, while FIG. 1 depicts a single primary storage subsystem and a single secondary storage subsystem, as many or as few storage systems as desired may be employed, remotely situated from one another in desired locations. Conventional uses for such storage systems are to facilitate sharing of data in a large enterprise, to provide increased reliability by providing backup copies of data, or the like.

The primary storage system generally operates under control of a host 101 which is coupled to the storage subsystem 102 by a channel 103. Channel 103 interfaces to the storage subsystem 102 via a channel controller 111. Typically, another channel controller 112 is used to interface the storage subsystem 102 with a channel 104 to network 105.

The secondary storage system 103 is similarly configured with host 106 controlling the secondary system 103 via channel 108 and channel controller 122. Another channel controller 121 provides an interface between the secondary storage subsystem 103 and the channel 109 coupled to network 105. Typical implementations for channels 103, 104, 108, and 109 are fibre channel, ESCON, SCSI, or GE. Channels 104 and 109 couple to network 105, which itself can be public or private.

Storage system 102, in addition to the channel controllers already mentioned, includes a cache memory 110 operating under control of a control table 117. An internal bus 114 allows cache memory 110 to communicate with the channel controllers 111 and 112 and with a disk controller 113. Through another internal bus 115, for example a fibre channel, SCSI, or ATA bus, disk controller 113 communicates with storage volumes 116. The storage subsystems are generally configured similarly. Thus, in general, the structure of the primary storage subsystem 102 is matched by the structure of the secondary storage subsystem 103.

Generally, data is shifted in and out of the primary storage subsystem via the channel controllers and the cache memory. As data arrives to be written into the storage volumes, it is temporarily stored in the cache memory and then retrieved by the disk controller to be written into the volumes. Similarly, as data is retrieved from the volumes 116 to be transmitted out over the network, it will generally be stored in the cache memory before being supplied to the channel controller in larger blocks. The storage subsystem translates physical disk addresses to logical disk addresses which are viewed by the host.

In a typical operation, it will be desired to write data from host 101 or from some other source into volumes 116 in the primary storage subsystem 102 and also "mirror" that data onto volumes 126 in the secondary storage subsystem 103. When that data arrives in random amounts at random addresses, the data may be handled in a normal manner and written into the primary and secondary systems. When, however, sequential events, rather than random events, cause writing of data, the load presented to the storage systems can be extreme. Typical sequential events include batch processes or back-up operations. Such operations can cause the cache memory in the primary or secondary storage to overflow (or "puncture") resulting in slower operation while the system is reset and the data retransmitted. To improve the efficiency of the storage system and increase its capability, it is desirable to prevent cache puncture. This allows sequential operations to be carried out more reliably and quickly. The implementation of this idea is discussed below.

Figure 2:
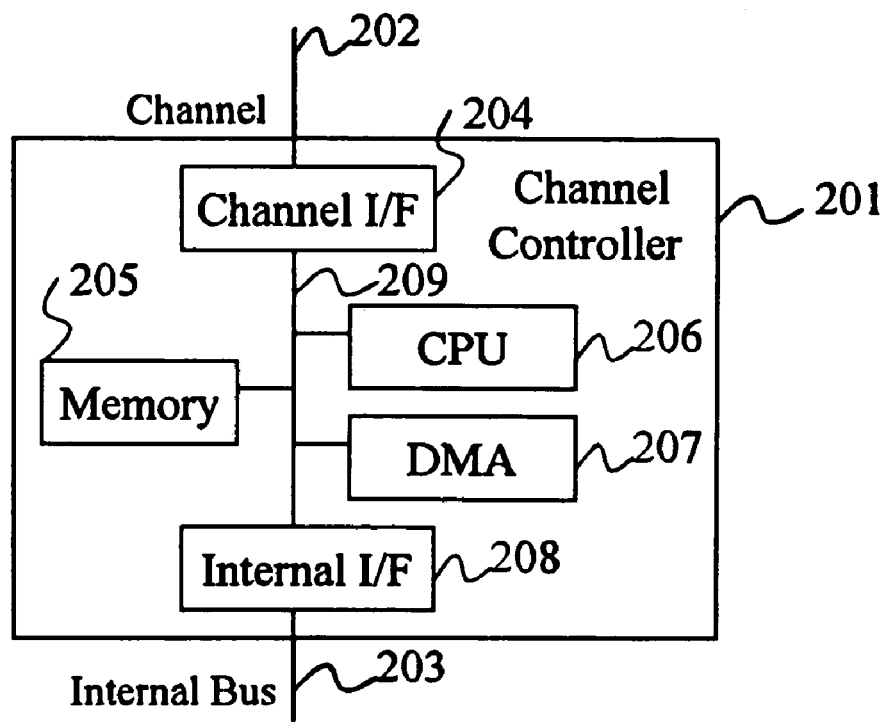
FIG. 2 is a block diagram of the channel controller.

FIG. 2 is a block diagram of the channel controller, for example any of the channel controllers shown as blocks 111, 112, 121 or 122 in FIG. 1. The channel controller 201 of FIG. 2 includes within it a channel interface 204, a central processing unit 206, memory 205, a direct memory access circuit 207, and interface 208 to an internal bus 203. Interface 204 serves to interface the channel controller with higher level functionality, for example, a network or a host, while interface 208 provides an interface for channel controller 201 to internal functionality of the storage subsystem, such as a cache memory or disk controller. CPU 206 controls the components of the channel 201 by communications over bus 209. The channel interface 204 controls the channel protocol and controls the transfer of data to and from the channel, and with CPU 206 and DMA 207, the transfer of data between memory 205 and channel interface 204. The internal interface 208 controls the protocol of transmissions on internal bus 203, and the control of data over that line in response to activities of the DMA controller 207 and memory 205.

Figure 3:
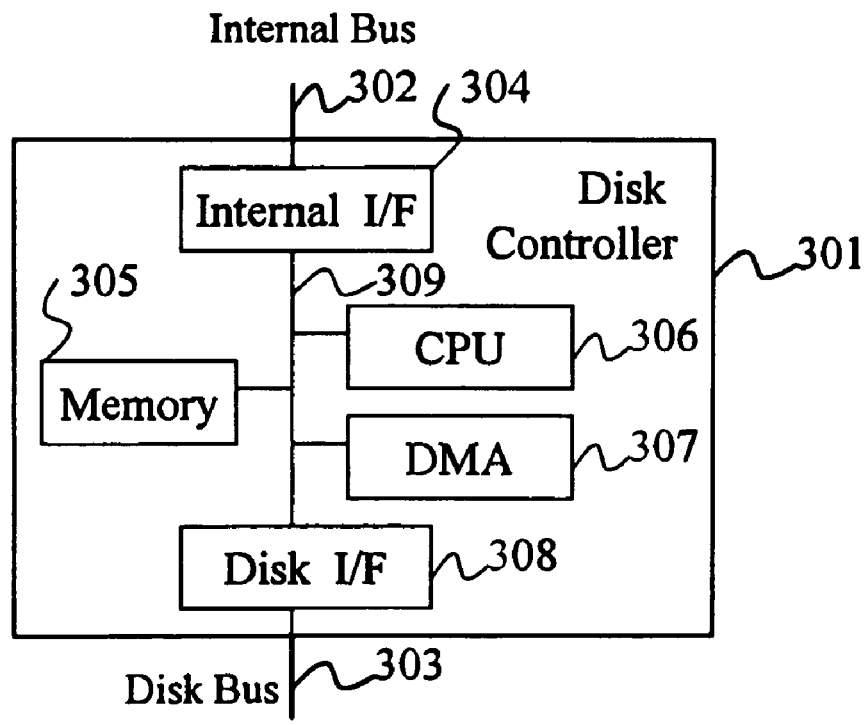
FIG. 3 is a block diagram of a disk controller.

FIG. 3 is a schematic diagram illustrating the structure of the disk controller 301. Controller 301 can be used to implement disk controllers 113 or 123 in FIG. 1. The disk controller has two types of interfaces. One interface, the internal interface 304, is an interface for the internal bus 302 (or 203 in FIG. 2). The other interface 308 is an interface for disk bus 303 to enable communications to the storage volumes coupled to the disk bus 303. The internal interface 304 and the disk interface 308 are coupled via bus 309. The disk controller includes a CPU 306 and memory 305, as well as a DMA controller 307. These components regulate the flow of information between the internal bus 302 and the disk bus 303. The internal interface 304 controls the internal bus protocol and transfers data to and from the internal bus, and to and from memory 305, in conjunction with DMA controller 307. Similarly, the disk interface 308 controls the protocol on the disk bus 303 and transfers data under control of CPU 306, DMA controller 307 between the memory 305 and the disk bus 303.

Figure 4:
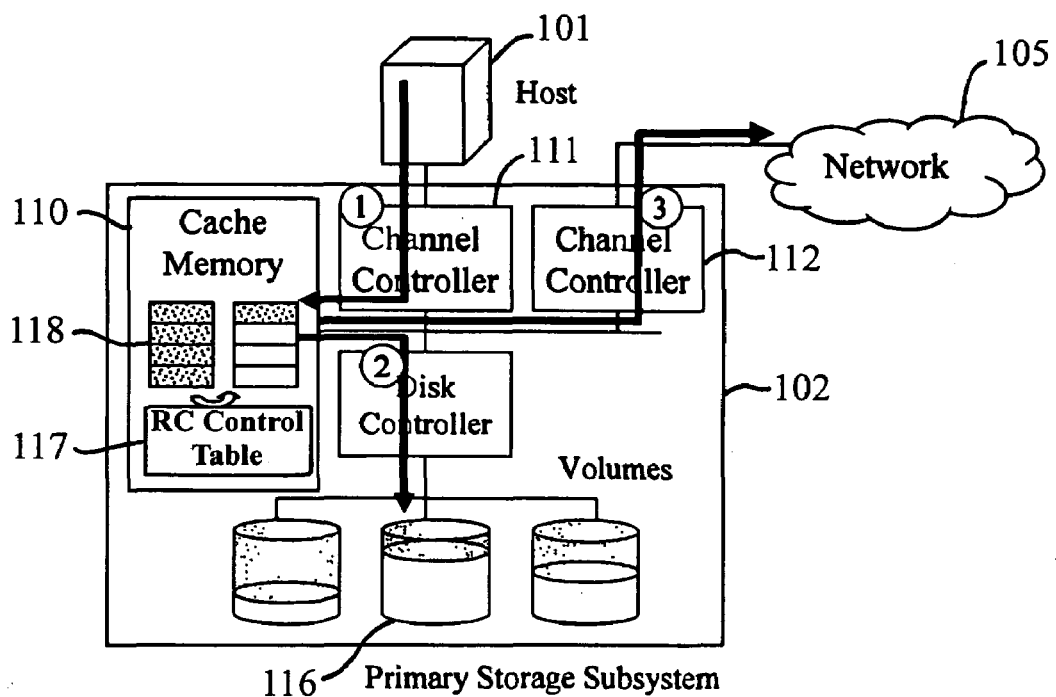
FIG. 4 illustrates remote copy throttling at the primary system.

Generally, the invention described herein is implemented by throttling. The throttling is achieved by one of several approaches. For example, by fixed allocation of bandwidth, by dynamic allocation of bandwidth, by manual settings, by automatic settings, and by introduction of wait states into data transmission. FIG. 4 is a diagram which illustrates an overview of throttling in operation on the primary storage system. As shown there, in step 1 the host 101 issues a write command to the primary storage system 102. (The primary and secondary storage systems are referred to herein interchangeably as "systems" or "subsystems" herein. When the perspective is from a global viewpoint, each can be viewed as a subsystem. When the perspective is from the viewpoint of that system, then "system" is frequently used.)

Figure 5:
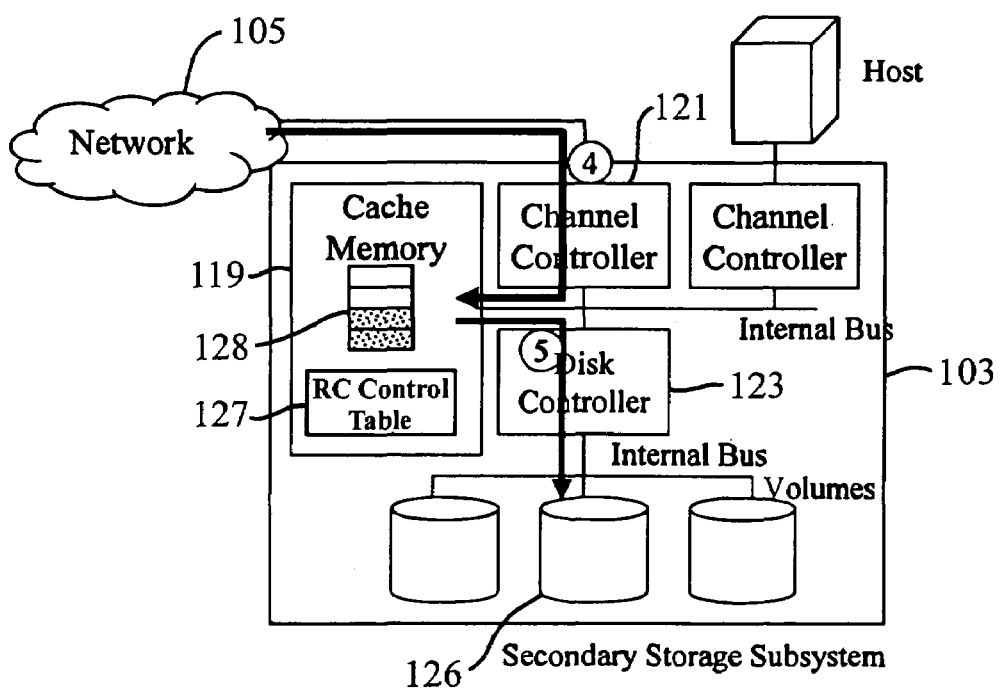
FIG. 5 illustrates remote copy throttling at the secondary storage system.

In response the channel controller 111 receives and analyzes the command. In the situation depicted, the channel controller 111 has received write data from the host 101 and stored it into the write cache memory 118 of cache memory 110. As this is occurring the channel controller 111 stores information regarding the need for a remote copy of the data into control table 117. Synchronously or asynchronously with writing data into disk 116, data is also moved to the cache memory 119 of the secondary or remote storage system shown in FIG. 5. This operation is often carried out by changing an attribute of the data from write pending to remote copy pending.

As indicated by step 3, the channel controller 112 will periodically check the control table 117. When the controller 112 finds one or more remote copy requests, controller 112 issues a remote copy command to the secondary storage subsystem 103 (see FIG. 5). When the data arrives at the remote storage subsystem shown in FIG. 5, it is first stored in a cache memory 119. In response, the remote system sends an acknowledgment back to the primary system. This causes the channel controller 112 to remove the request from control table 117 and remove the data from the cache memory 118.

If the remote copy operation has been synchronous, the primary storage system 102 will issue a remote copy command without issuing a write operation to disk volumes 116. Once the remote copy operation completes, the primary storage system 102 returns the status to host 101.

As mentioned above, FIG. 5 illustrates the operations of the secondary storage subsystem 103. The initial copy (and remote copy) data arrive at the storage system 103 from network 105. There, the channel controller 121 analyzes the incoming commands and stores the data into cache memory 128 and control information into control table 127. As shown by step 5, disk controller 123 periodically checks the control table 127. If controller 123 finds the procedures to be completed, then controller 123 reads the data from the cache memory 128 and writes it onto disk volumes 126.

Figure 6:
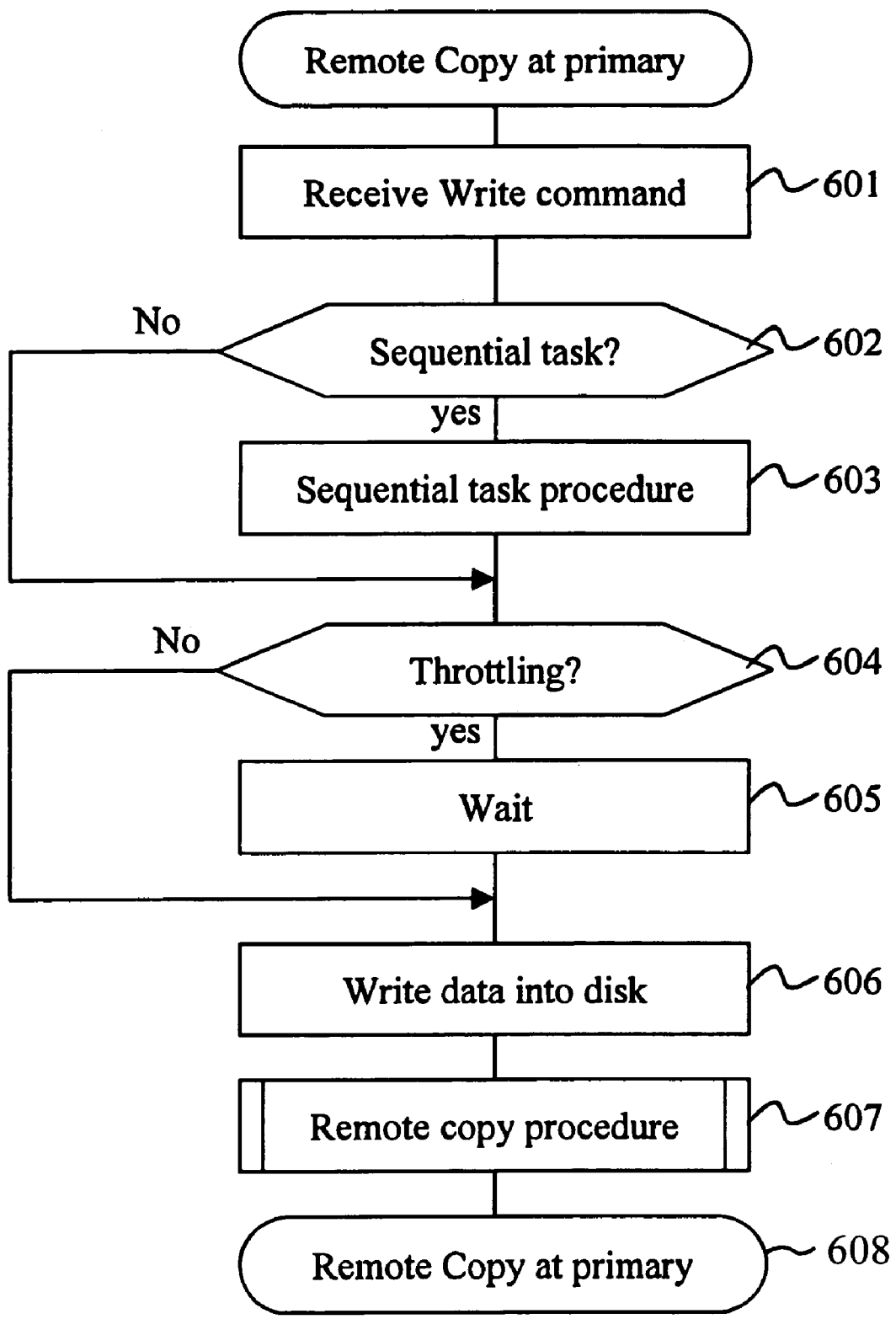
FIG. 6 is a flowchart illustrating remote copy operations at the primary storage system.

FIG. 6 illustrates a preferred embodiment of the throttling procedures of this invention. FIG. 6 is a flowchart for the asynchronous remote copy operation carried out at the primary storage system 102. This operation is carried out under control of CPU 206 (see FIG. 3) of channel controller 111. This CPU handles tasks 601 to 606 as shown in FIG. 6. CPU 206 of channel controller 112 carries out the remote copy procedure 607 shown in FIG. 6.

At step 601, host 101 has issued a "write" command. Channel 204 has received it and reports to the CPU 206 via memory 205. The CPU 206 analyzes the command to determine if it is valid. If it is invalid, CPU 206 issues "no good" status via the channel interface 204 to host 101. These steps are common in SCSI-based systems and in accordance with that specification.

At step 602 the CPU determines the task. If the task is a sequential task, CPU 206 indicates that and creates the sequential task in a task management table discussed below in conjunction with FIG. 8. If it is not a sequential task, then the sequential task procedure 603 is not necessary, and the operation moves to step 604. Alternatively, following determination of the sequential task procedure, the operation also moves to step 604.

At step 604 a determination is made of whether throttling is required for the task or the disk group. This determination may be made based upon any of a number of parameters analyzed, for example, the usage of the cache memory, the ratio of access patterns (sequential:random), the rate of change of growth in cache memory usage or access patterns, network or disk resource usage, etc. In the preferred embodiment, cache memory usage is employed; however, any of the other techniques mentioned above, or still further techniques, may be employed. The throttling is not necessarily the procedure moves to step 606. On the other hand, if throttling is needed, the procedure moves to step 605. In this circumstance the primary storage system 102 must wait for more system resources to become available, or the system resources themselves must be reallocated. In the case of the system needing to wait, there are several techniques which may be employed. One is to insert a wait time or wait state into the process flow, as will be described in conjunction with FIG. 9. Another approach is to wait until the cache memory has more space available. To implement that decision, a statistics table is employed, as will be discussed in conjunction with FIGS. 7 and 8.

Referring back to FIG. 6, once the wait states are introduced, or other appropriate changes are made to implement throttling, the data is then written into the disk at step 606 just as if the normal write request had been received. A remote copy procedure 607 is then performed to copy the data from the primary system to the secondary system. Once this is established, the remote copy of the primary system is considered completed as shown by step 608.

FIG. 7 is an example of a statistics table for disk groups. A disk group consists of one or more disk volumes, for example volumes 116 in the primary storage system. The statistics table itself is a part of the control table shown in FIGS. 4 and 5. The table depicted in FIG. 7 includes both throughput information and cache size information for each of three disk groups, group 0, group 1 and group 2. Each group has an allocated value which is set by the system administrator. For example, disk group 1 has an allocated cache size of 250 megabytes. In addition to the allocated information, the statistics table also includes information about current throughput and current cache size. For example, disk group 1 has 120 megabytes of the 250 megabyte cache presently occupied with data in the process of being written. The information shown in the table of FIG. 7 is typical, and may certainly encompass additional or different information. For example, the statistics table may also maintain information regarding the amount of data transferred over a certain period in a similar operation in the past. Using the information it receives regarding system resources, the primary storage system 102 updates the statistics table as new information arrives.

Another example of a statistics table is shown in FIG. 8. As shown there, the table is created on a task-by-task basis. The first row shows statistics associated with sequential task 0, while the second row shows statistics associated with sequential task 1. For each task a disk number is referenced, and throughput and cache size are also indicated both as allocated and as currently used.

Referring back to FIG. 6, once the throttling procedure is completed, the write request is dealt with in the same manner as a normal write request for remote copy, without regard to whether it is asynchronous or synchronous. This is implemented, with reference to FIG. 2, by CPU 206 commanding the channel interface 204 to begin transferring data from host 101. The interface 204 then transfers data from the channel to the memory 205. Once this operation is begun, the CPU 206 commands DMA unit 207 to transfer data from memory 205 into the cache memory 110 (see FIG. 1) via an internal interface 208 over internal bus 203. CPU 206 controls the interface 208 to preclude it from overtaking the channel interface 204. Once all the data are transferred into the cache memory 110, the CPU 206 sends an appropriate message of the status back to host 101 via interface 204 and channel 103. The CPU also updates control table 117.

The internal write requests are handled in the manner of a FIFO queue. As shown by FIG. 3, the CPU 306 of the disk controller 113 periodically checks the control table 117. When it detects a request to be processed by the disk controller 113, the CPU 306 begins the procedure, in this case a "write" procedure. All the information needed for this transfer is maintained in the control table 117. The CPU 306 then requests the DMA 307 to transfer data from the cache memory 101 to the memory 305 in a manner such that the channel controller 111 is not overtaken. As this data transfer occurs, the DMA unit 307 can enable other operations to occur based upon the information being transferred. Once some information is stored into memory 305, CPU 306 starts a data transfer from memory 305 to disk 115 via disk interface 308 and disk bus 303. CPU 306 controls the disk interface 308 to preclude it from overtaking the internal interface 304. After all of the data is stored on the disks, the CPU 306 creates a remote copy procedure and issues remote copy information into control table 117. With this procedure the primary storage system 102 begins moving data from the write cache 118 to the remote copy cache. At this point the remote copy command 607 (see FIG. 6) is issued. The channel controller 112 will periodically check control table 117 in the primary system. When the channel controller 112 detects the remote copy request, it will start the remote copy procedure 607. If there is more than one remote copy procedure, the CPU 206 may combine them into one operation.

Figure 9:
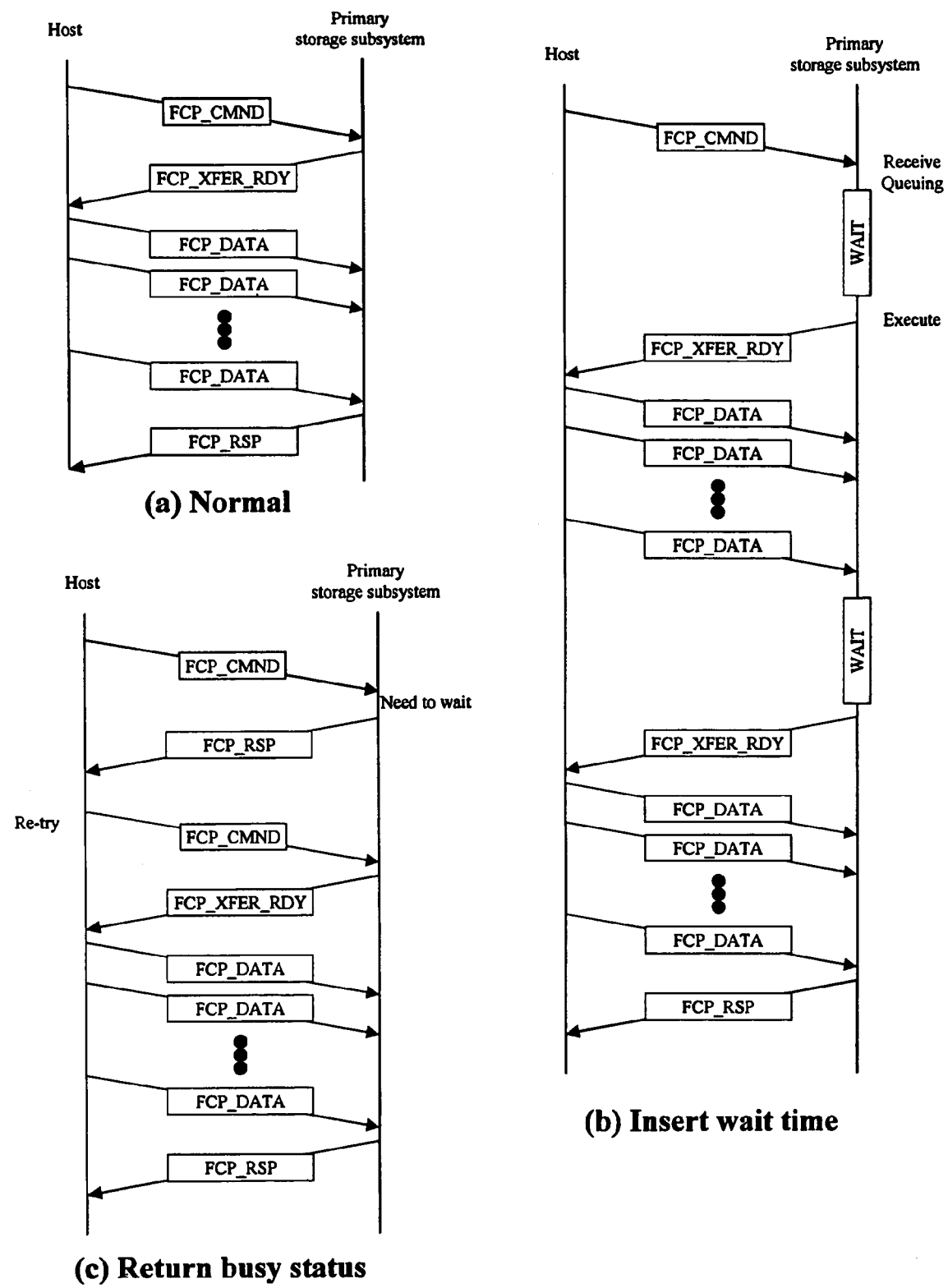
FIG. 9a illustrates a normal sequence for a write command.
FIG. 9b illustrates a method for inserting wait times.
FIG. 9c illustrates a method for returning a busy status report.

FIG. 9 is a series of diagrams which illustrate how a wait state or wait time may be introduced into the operations. In each of FIGS. 9a, 9b and 9c, the vertical line on the left side of the figure represents the host, and the vertical line on the right side of the figure represents the primary storage system. The oldest events are shown near the top of each figure, and the resulting data transfers, acknowledgments, etc., then are depicted lower down in the figures, representing the passage of time. FIG. 9 illustrates the approach to insert a wait time using the well known fibre channel SCSI framework (FCP). It should be understood, however, the other protocols such as ESCON, FICON, etc., may also be employed because almost all protocols have transfer ready acknowledgement type messages employed in them, facilitating the use of this invention.

FIG. 9a illustrates a normal sequence of operations for a write command (FCP_CMND). This command is issued by the host 101. Primary storage system 102 receives the FCP command and analyzes it. If the request is valid and the storage system 102 is ready to receive data, the storage system 102 issues a response (FCP_XFER_RDY). This acknowledgement means that data may now be transferred. The data transferred is shown in FIG. 9a as FCP_DATA. As shown, the data may be transferred in a number of operations. After all the data is received at the primary storage subsystem, that subsystem issues FCP_RSP which indicates that all data transfer is completed without error. As said above, this is a normal operation.

FIG. 9b illustrates the insertion of wait states or wait time for the same type of operation. As shown there, when the primary storage subsystem needs to insert a wait time, it can be asserted before acknowledging receipt of the FCP_CMND command. In FIG. 9b, the storage system in that example has inserted such a wait time before acknowledging the command from the host. In effect, the command from the host has been queued. The duration of this wait time may be set statically or dynamically, that is, by the system administrator, or based upon the information in the statistics tables. As in FIG. 9a, once the primary storage subsystem acknowledges it is ready to receive data by sending the acknowledgement signal, some data is transferred from the host to the primary storage subsystem. At any point in that data transfer, the storage subsystem may insert additional wait times, then restart the data transfer by sending an FCP_XFER_RDY signal back to the host. This triggers the sending of additional data. That procedure continues until all of the data is transferred.

FIG. 9c illustrates another operation in which a busy signal is returned by the primary storage signal to the host. In FIG. 9c, upon receipt of the FCP_CMND command, the primary storage subsystem 102 returns "busy" status with the FCP_RSP. This signal informs the host that the primary storage system is busy, and the host needs to wait. After the host waits, it will then issue the same request again. This procedure will be repeated until the storage subsystem acknowledges the write command by sending back the acknowledgement signal. At that point data will be transferred, and an error-free transfer will be acknowledged. Of course, by software customization various priorities can be given to various signals to assure that the primary storage subsystem does not return a busy status more than a certain number of times before whatever activity is ongoing is overridden.

We next discuss the technique by which the wait time may be determined. Using the statistics tables, which have statistics information for groups of volumes or tasks, the wait time can be defined in a number of ways. In one technique it is predefined. In this approach the primary storage subsystem 102 has a predefined value for each situation of cache memory usage and throughput. These predefined values are stored in a table, and the appropriate entry chosen and employed when necessary. As an example, the predefined value can be calculated based upon cache usage ratio and allocated size. For example, if the cache usage ratio is 70% against its allocated size, a 50 millisecond wait is introduced. If the cache usage ratio is 80%, a 100 millisecond wait may be introduced.

A second approach for determining the wait time is dynamic. Generally, this will be more efficient than the predefined approach discussed above. In the dynamic circumstance, the primary storage system can be programmed, for example, to know that a 1 gigabit-per-second fibre channel can handle data at a rate of 100 megabytes per second. Thus, if the cache or throughput usage ratio (current/allocated) exceeds some threshold, the storage system 102 can introduce a wait which depends upon the particular request. For example, if the allocated throughput is 500 Kbytes per second, and the request is for 1 megabyte per second, then the wait time will be determined by the estimated time with allocated throughput less the actual execution time (data transfer time). In the particular example, $$1MB/500kB/s - 1MB/100MB/s = 2s - 0.01s = 1.99s$$

Thus, in this example, the wait time would be 1.99 seconds. Depending upon the number of milliseconds per acknowledgement signal, there might need to be possibly 100 such acknowledgements before a data is completely transferred.

Another approach for throttling in lieu of calculation of wait times is to control throttling using the cache memory size. This is implemented by triggering throttling when the current cache size (space remaining) or the throughput exceeds a threshold value. At this point the primary storage system will begin to throttle, and will continue it until enough cache memory space is left. As this is occurring, the remote copy procedure at channel controller 112 will be removing information from the cache and increasing its size.

Figure 10:
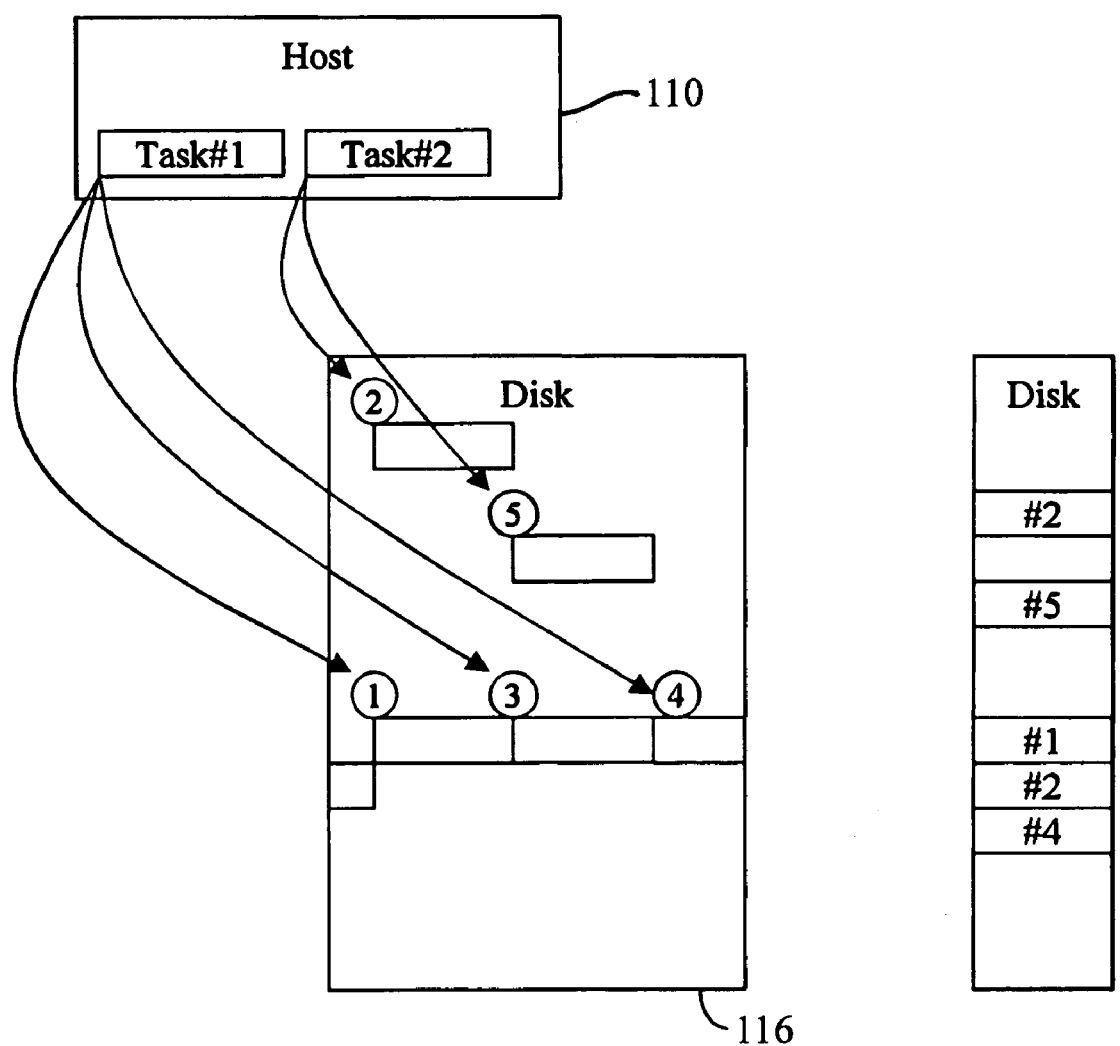
FIG. 10 illustrates an example in which mixed tasks are executed.
Figure 11:
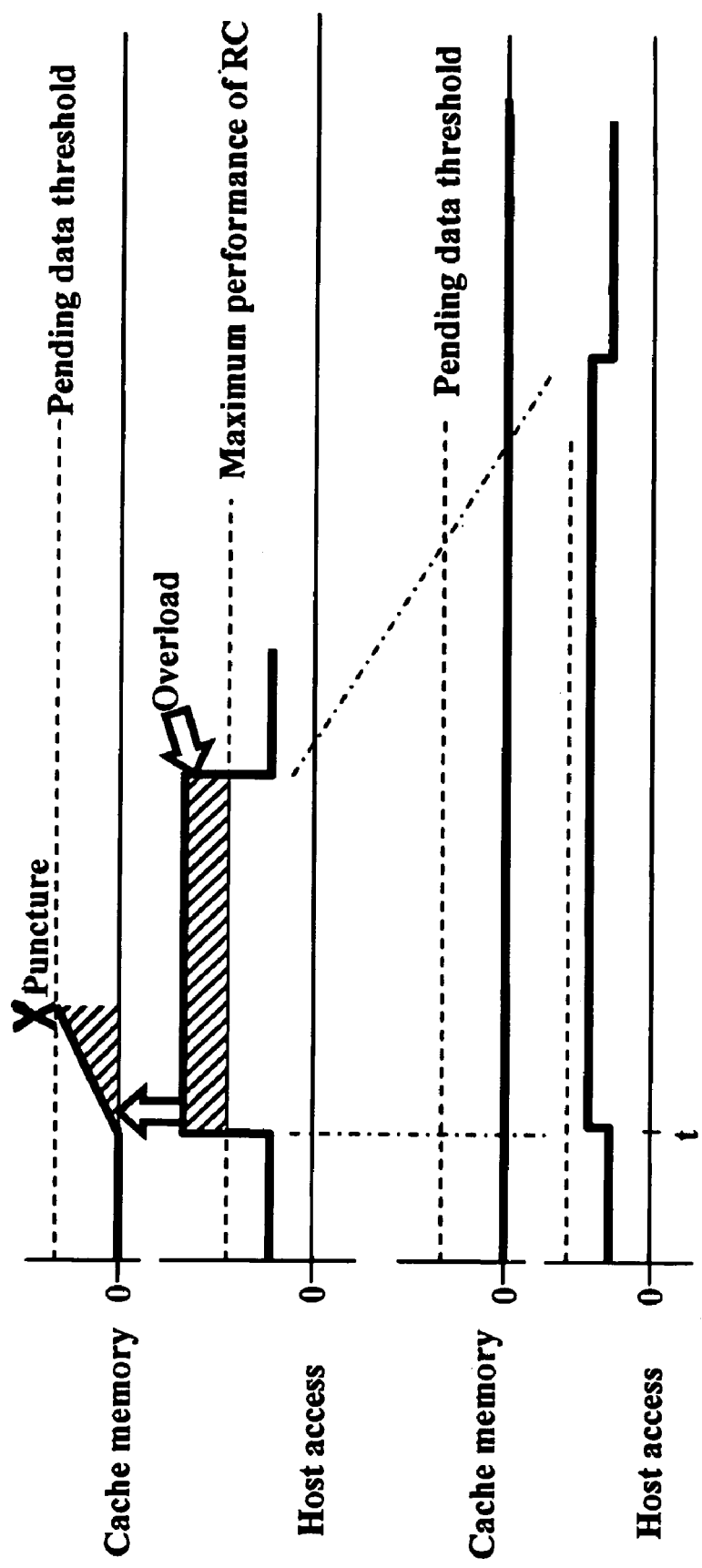
FIG. 11 is a timing diagram illustrating the undesirable circumstance of cache puncture.

FIG. 10 is a block diagram illustrating an example of a situation in which mixed sequential and random tasks write data to disk 116. In the figure the numbered lines 1–5 represent the order in which the write requests have been sent. As shown, requests 2 and 5 are random (unrelated regions of the disk) while requests 1, 3 and 4 are sequential requests, requesting writes to sequential portions of the disk. Requests 2 and 5 resulted from task No. 2, while requests 1, 3 and 4 resulted from task No. 1. From the point of view of the primary storage 102, however, there are simply five random requests. In this circumstance, for the storage subsystem 102 to detect the sequential nature of the accesses, the storage system must maintain an access history. This is shown in the diagram at the right-hand side of FIG. 10. By maintaining data at the write cache for a short time, the primary storage system will have management information for use in the control table and can detect that writes 1, 3 and 4 are actually sequential writes.

The system described above provides for throttling remote copy procedures, and is particularly beneficial in the case of operations occurring over wide area networks where throughput is usually slower. The invention provides a solution to the unbalanced performance situation between the host 101 with its channel controller, and the disk with its channel controller. The invention allows the user to configure the remote copy within a low cost network.

What is claimed is:

1. A storage system method comprising:
   receiving a storage command from a host computer;
   determining whether execution of writing information associated with the storage command into a cache memory is to be delayed, the determining being based on a ratio between the number storage commands that are sequential accesses and the number storage commands that are random accesses;
   if execution of writing information into the cache memory is determined to be delayed, then delaying execution of writing information associated with the storage command into the cache memory;
   subsequent to delaying execution, writing the information associated with the storage command into the cache memory; and
   subsequent to writing to the cache memory, and further in response to receiving the storage command, storing the information in storage volumes in the storage system.

2. A method as in claim 1 wherein the measure of relative availability of the cache memory is stored in a table based on one of a group of storage volumes or a sequential task.

3. A method as in claim 2 wherein the table includes measures of allocated capacity and current capacity.

4. A method as in claim 2 wherein the table includes a measure of cache memory size available and throughput available.

5. A method as in claim 1 wherein the wait has a predetermined duration.

6. A method as in claim 1 wherein the duration of the wait is determined dynamically based upon the then available system resources.

7. In a storage system having storage volumes, the system operating under computer control and coupled to a host to receive information to be stored in the storage volumes, a method comprising:
   in the storage system, receiving data I/O commands and performing I/O with the storage volumes to service the data I/O commands;
   in the storage system, monitoring the data I/O commands sent between the host and the storage system to determine a measure of throughput requested by the host in having the storage system write data within the storage volumes in the storage system; and
   sending to the host a request to wait if the measure of throughput exceeds a specified quantity,
   wherein the measure of throughput is a rate of change of growth in cache memory usage.

8. A method as in claim 7 wherein the data to be written in the storage system is first supplied to a cache memory within the storage system, and later written to the storage volumes in the storage system.

9. A method as in claim 7 further comprising also storing the information in a secondary storage system.

10. A method as in claim 9 wherein the information is stored in a secondary storage system synchronously with being written to the storage volumes.

11. A method as in claim 9 wherein the information is stored in a secondary storage system asynchronously with being written to the storage volumes.

12. A method as in claim 7 wherein the storage volumes comprises an array of hard disk drives.

13. A method for controlling writing of data in a storage system coupled to a host computer, the storage system having a plurality of storage volumes into which the data is stored, the method comprising:
  receiving I/O operations from the host, and in response thereto, performing I/O with the storage volumes to service the I/O operations;
  analyzing a write operation requested by the host to determine if the requested write operation calls for a sequential task in which consecutive sectors of storage volumes are addressed or a random task in which disparate sectors of storage volumes are addressed;
  if the requested write operation is a sequential task, storing information about the sequential task in a task management table;
  using information in the task management table to determine if throttling is needed to carry out the requested write operation, wherein the determination is based on a ratio between the number I/O operations that are sequential accesses and the number I/O operations that are random accesses, or based on a rate of change of growth in cache memory usage; and
  if throttling is needed, applying a throttling technique to the sequential task whereby data associated with the sequential task is written to a cache memory of the storage system after a delay.

14. A method as in claim 13 wherein the determination of whether the requested write operation calls for a sequential task includes determination of whether the requested write operation involves a single group of storage volumes.

15. A method as in claim 13 wherein the determination of whether the requested write operation calls for a sequential task includes determination of whether the requested write operation involves more than a single group of storage volumes.

16. A method as in claim 15 wherein throttling is controlled based upon both the determination of a sequential task and whether more than a single group of storage volumes are to have data written to them.

17. A method as in claim 13 wherein the throttling technique is selected based upon data in a table of statistical data.

18. A method as in claim 13 wherein the throttling technique comprises inserting wait states into the write operation to delay it.

19. A method as in claim 18 wherein the step of inserting wait states into the write operation comprises inserting a predefined wait time into the write operation.

20. A method as in claim 18 wherein the step of inserting wait states into the write operation comprises calculating a wait time at the time the wait time is to be inserted into the write operation.

21. A method as in claim 18 wherein following use of the throttling technique normal operation is resumed to write any remaining data into the storage system.

22. A method as in claim 13 wherein the throttling technique comprises:
  monitoring a cache memory into which data is stored before being written to the storage volumes; and
  when a predetermined amount of the cache memory has been filled, waiting for the cache memory to have more space before additional data are stored in the cache memory.

23. A method as in claim 22 wherein following use of the throttling technique normal operation is resumed to write any remaining data into the storage system.

24. A method as in claim 13 wherein the table uses a measure of throughput to determine whether throttling is to be applied.

25. A method as in claim 14 wherein the table uses an indication of an amount of cache memory available to determine whether throttling is to be applied.

26. A method as in claim 14 wherein the table uses both a measure of throughput and an indication of an amount of cache memory available to determine whether throttling is to be applied.

* * * * *